United States Patent
Wu (10) Patent No.: US 11,192,182 B2
(45) Date of Patent: Dec. 7, 2021

(54) METHOD AND SUBSTRATE FOR EASY RELEASE OF PARTS MADE BY COLD SPRAY

(71) Applicant: The United States of America, as represented by the Secretary of the Navy, Arlington, VA (US)

(72) Inventor: Chun-Hsien Wu, Louisville, KY (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 16/192,434

(22) Filed: Nov. 15, 2018

(65) Prior Publication Data

US 2019/0151942 A1    May 23, 2019

Related U.S. Application Data

(60) Provisional application No. 62/587,580, filed on Nov. 17, 2017.

(51) Int. Cl.
| | | |
|---|---|---|
| *B22F 3/00* | (2021.01) | |
| *B22D 23/00* | (2006.01) | |
| *B22F 3/02* | (2006.01) | |
| *C23C 24/04* | (2006.01) | |
| *B33Y 40/00* | (2020.01) | |
| *B33Y 10/00* | (2015.01) | |
| *B33Y 30/00* | (2015.01) | |
| *B22F 10/40* | (2021.01) | |

(52) U.S. Cl.
CPC ............ *B22F 3/005* (2013.01); *B22D 23/003* (2013.01); *B22F 3/02* (2013.01); *C23C 24/04* (2013.01); *B22F 10/40* (2021.01); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS 6,181,874 B1 * 1/2001 Ireland .................... F24H 1/103
                                                          392/398

* cited by examiner

*Primary Examiner* — Colin W. Slifka
(74) *Attorney, Agent, or Firm* — Naval Postgraduate School; Scott Bell (57) ABSTRACT

A substrate for 3D printing using a cold spray technique. The substrate of the present invention has a porous surface with the size of pores smaller than approximately 24.4 times the mean particle size of feedstock powders for cold spray processing and larger than or equal to approximately 6.84 times the mean particle size. Due to no adhesion of a 3D-printed part to the porous regions of the substrate, the parts fabricated by cold spray can be easily removed from the porous substrate without cutting.

9 Claims, 9 Drawing Sheets

METHOD AND SUBSTRATE FOR EASY RELEASE OF PARTS MADE BY COLD SPRAY

CROSS-REFERENCE TO RELATED APPLICATIONS

This application claims the benefit of U.S. Provisional Application No. 62/587,580, filed Nov. 17, 2017, which is hereby incorporated in its entirety by reference.

BACKGROUND OF THE INVENTION

1. Field of the Invention

The present invention relates generally to methods and substrates used in forming parts by a cold spray technique.

2. Description of the Related Art

Cold spray is a type of solid state additive manufacturing technique often used in three dimensional (3D) printing to form an item. Feedstock powders are injected into a convergent-divergent nozzle and accelerated by high pressure gas, most commonly compressed air, nitrogen, or helium, to supersonic speed. Once the impacting velocities of the feedstock powders exceed critical velocity, the powders adhere to the substrate with plastic deformation. The cold spray is conducted at relatively low temperatures and no melting of feedstock powders is involved in the deposition process. A dense item with low oxide content can be formed with this technique.

Conventionally 3D-printed items were fabricated by deposition of feedstock powders on a non-porous support, a non-porous scaffold, or a non-porous solid substrate using cold spray. After the completion of the cold spraying process, the items were bonded to the substrate. In order to remove the 3D-printed items from the substrate, the interface between the 3D printed items and the substrate needed to be cut. This resulted in post processing operations to break apart the item from the substrate and typically destructions of the substrate on which the item was formed.

As an example, feedstock powders were injected into a convergent-divergent nozzle and accelerated by high pressure carrier gas to supersonic speed. Once the impacting velocities of the feedstock powders exceeded critical velocity, the powders adhered to a non-porous support, a non-porous scaffold, or a non-porous solid substrate with plastic deformation. A dense part with low oxide content was fabricated by cold spray and bonded to the substrate. Without cutting, the metal sheets could not be removed from the substrate.

SUMMARY OF THE INVENTION

Embodiments in accordance with the invention relate a porous substrate. The porous substrate includes a porous layer for use as a base on which a part is formed by cold spraying one or more feedstock powders, where the part does not permanently bond with the porous layer. The porous layer further includes a number of pores, where each of the pores has a pore size that is less than a maximum pore-particle ratio times a mean particle size of the one or more feedstock powders.

In some embodiments, the maximum pore-particle ratio is approximately 24.44. In other embodiments, the maximum pore-particle ratio is approximately 6.85. In some cases, the mean particle size is determined as a mean Feret diameter of the one or more feedstock powders.

In one or more embodiments, the porous substrate further includes a nonporous underlayer on a bottom surface of the porous layer, where the part is formed on a top surface of the porous layer.

In some embodiments, the mean particle size is between and including 11.0 micrometers and 14.7 micrometers. In these embodiments, the porous layer can be a wire mesh, where the pores are through-pores. In some cases, the wire mesh has a wire thickness that is equal to or less than approximately 55.5 micrometers.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a porous substrate for removably forming a part created by cold spray.

Described herein is a porous substrate for forming parts by cold spray. The porous substrate has a pore size that is selected according to the mean particle size of the feedstock powder used for the cold spray. Specifically, the pore size of the porous substrate can be less than a maximum pore-powder ratio times the mean particle size of the feedstock powders. For example, the maximum pore-powder ratio could be about 24.44. In another example, the maximum pore-powder ratio could be about 6.85.

Typically, 3D printed parts that are fabricated by cold spray are bonded to the substrate. To facilitate the part removal process and eliminate the extra cutting step to remove the part from the substrate, the porous substrate described herein can be used when cold spraying. Even with the pore size bigger than the average particle size of the feedstock powders, a portion of the feedstock particles do not penetrate into the porous substrate because of the adhesion of the impacting particles to the edges of the pores, which reduces the size of and eventually covers the pores with the impacting particles. Since there is no adhesion between the 3D-printed parts and the porous regions of the substrates, the 3D-printed parts fabricated by cold spray can then be easily removed from the porous substrates without cutting.

Figure 1:
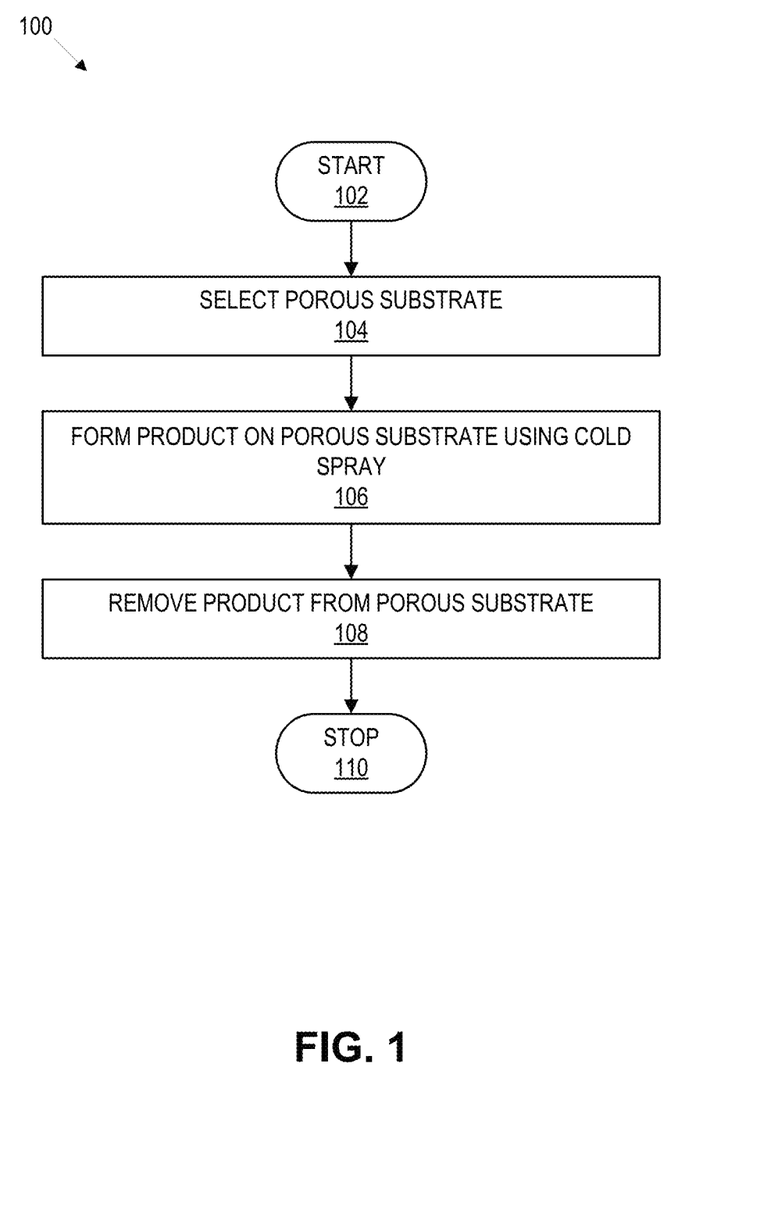
FIG. 1 illustrates a workflow for removably forming a part on a porous substrate.

FIG. 1 illustrates a workflow 100 for removably forming a part on a porous substrate. As is the case with the other processes described herein, various embodiments may not include all of the steps described below, may include additional steps, and may sequence the steps differently. Accordingly, the specific arrangement of steps shown in FIG. 1 should not be construed as limiting the scope of removably forming a part on a porous substrate.

In block 104, a porous substrate is selected. Specifically, the porous substrate is selected based on the mean particle size of the feedstock powders. Mean particle size refers to the average size of solid particles in the feedstock powders. The mean particle size can be determined, for example, by using a scanning electron microscope. In this example, image processing software can be used to detect the edges of particles in the electron microscope image, where particle sizes of the edges are used to determine the mean particle size of the feedstock powders. Other techniques can be used to determine the mean particle size including, but not limited to, laser diffraction, dynamic light scattering, sedimentation, image analysis, acoustic spectroscopy, etc. Once the mean particle size is known, the pore size of the porous substrate can be determined with respect to the mean particle size.

In some cases, the pore size selection can be accomplished by using test data that identifies an ideal ratio between the pore size of the porous substrate and the mean particle size of the feedstock powder. The test data can indicate that the pore size of the porous substrate should be less than a maximum powder-pore ratio. For example, the maximum powder-pore ratio can be 24.44. In another example, the maximum powder-pore ratio can be 6.85. A mesh substrate that satisfies the ratio can be selected and used as the porous substrate.

Figure 2A:
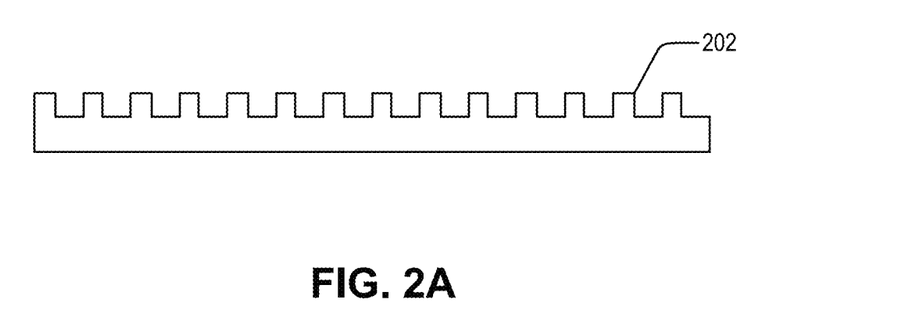
FIG. 2A illustrates a cross section of a porous substrate.
Figure 2B:
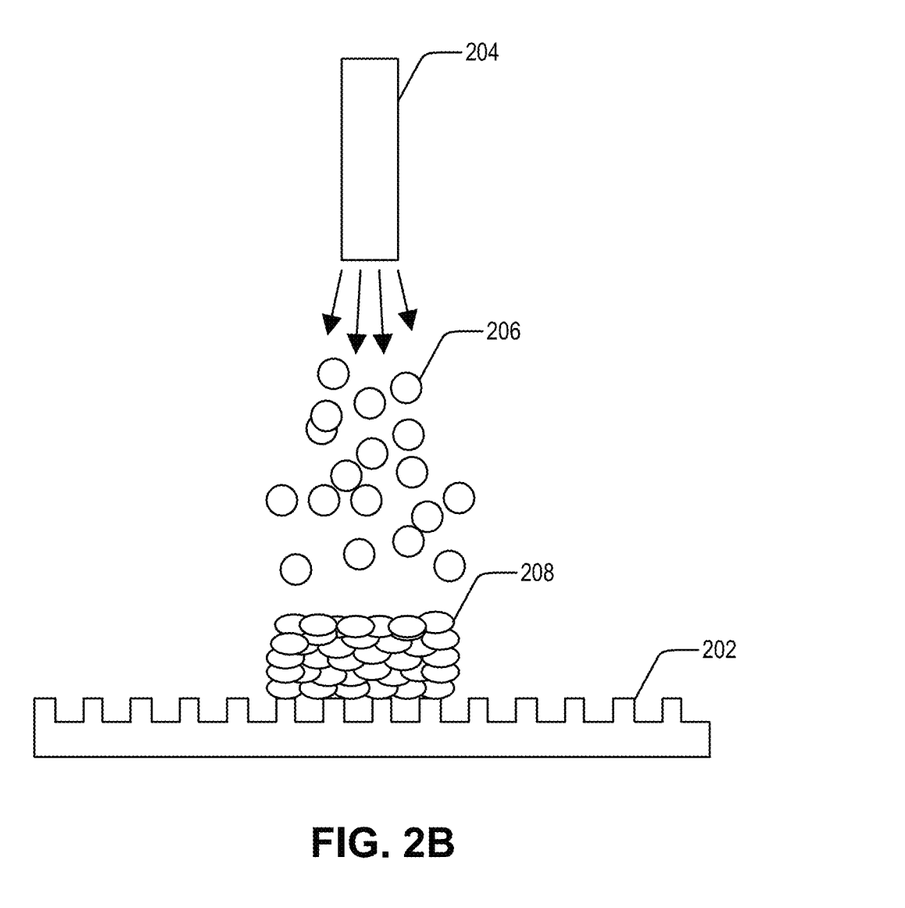
FIG. 2B illustrates a cold spray process onto a cross section of a porous substrate.
Figure 2C:
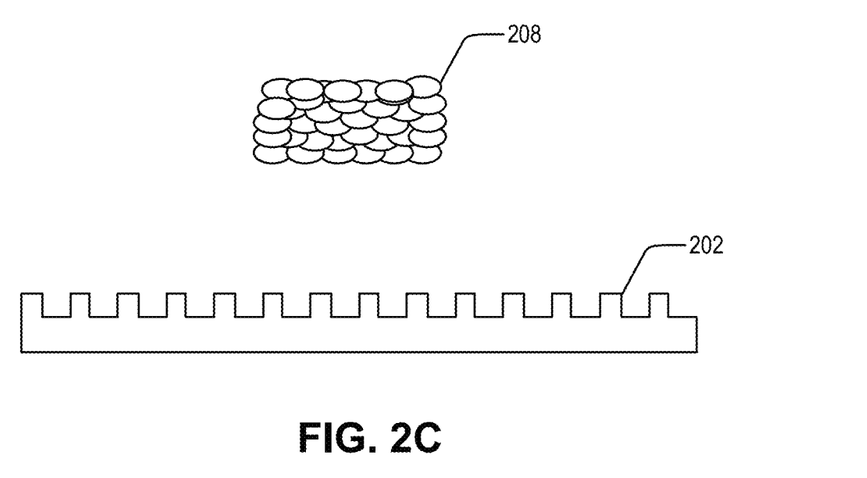
FIG. 2C illustrates a product removal process from a cross section of a porous substrate.
Figure 3A:
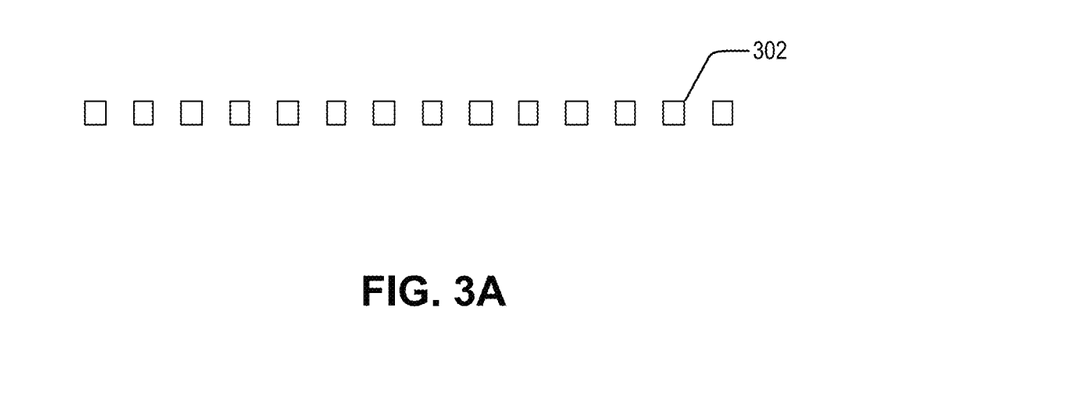
FIG. 3A illustrates a cross section of a mesh substrate.
Figure 3B:
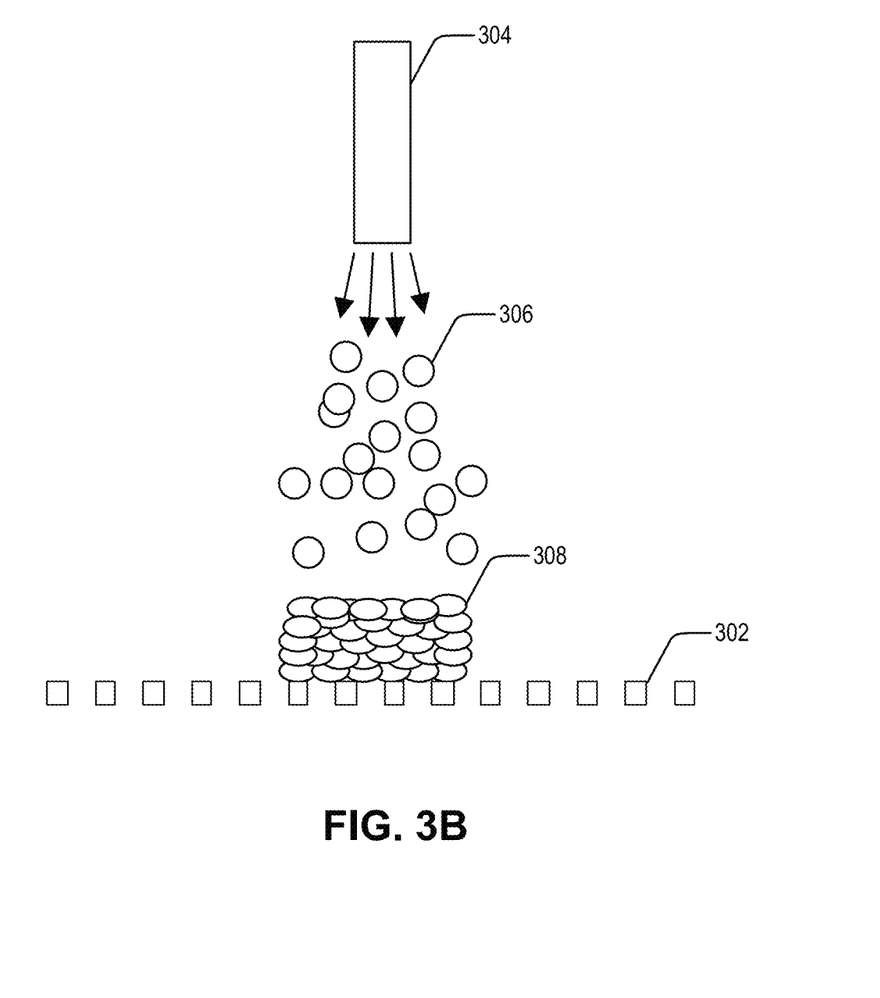
FIG. 3B illustrates a cold spray process onto a cross section of a mesh substrate.
Figure 3C:
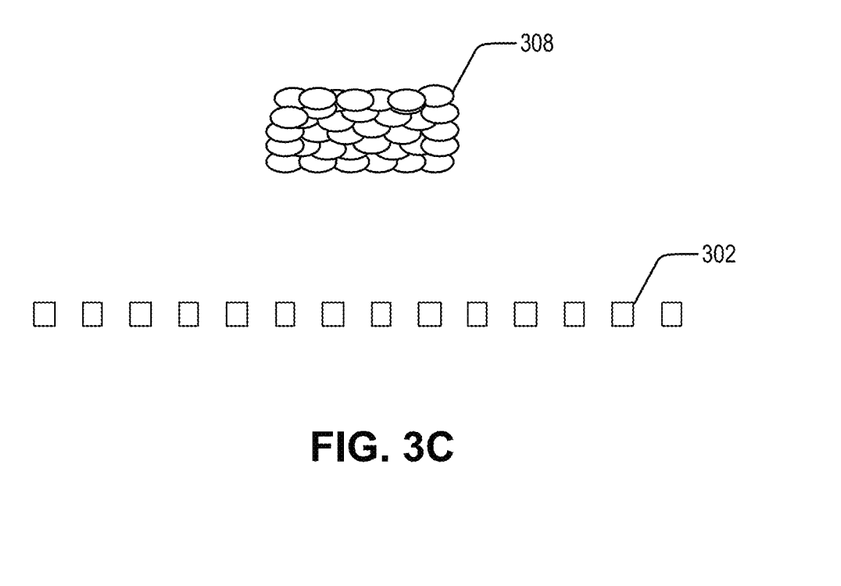
FIG. 3C illustrates a product removal process from a cross section of a mesh substrate.

The pores of the substrate can be on the surface as described with respect to FIGS. 2A-2C, through the substrate as described with respect to FIGS. 3A-3C, or both. The substrate can be firm or flexible.

In block 106, a product is formed on the porous substrate using cold spray. The feedstock powders are accelerated towards the porous substrate in a supersonic gas jet. Upon impact, even the pore size is bigger than the mean particle size of the feedstock particles, a portion of the feedstock particles do not penetrate into the substrate due to the particles' adhesion to the edge of the pores, which eventually results in the pores being covered by the feedstock particles. In this manner the final product is formed without being permanently bonded to the porous substrate.

In block 108, the product is removed from the porous substrate. Because the product is not bonded to the porous substrate, the product can be easily removed from the porous substrate without cutting. The easy removal decreases the probability that the porous substrate is damaged during the removal process, which allows for the porous substrate to be reused for future cold spray applications.

FIG. 2A illustrates a cross section of a porous substrate 202. The porous substrate 202 has a porous surface formed above a non-porous base in accordance with one embodiment of the present invention. The porous surface includes a number of pores formed on the top surface of the porous substrate 202. In one example, each of the pores of the porous substrate 202 is smaller than 24.44 times the mean particle size of a feedstock powder. In another example, each of the pores of the porous substrate 202 is smaller than or equal to 6.84 times the mean particle size of the feedstock powder.

FIG. 2B illustrates a cold spray process onto the cross section of the porous substrate 202. A cold spray nozzle 204 emits feedstock powder 206 onto the porous substrate 202 to form a part 208. The feedstock powder 206 is injected into the cold spray nozzle 204 and accelerated by, for example, high pressure carrier gas to supersonic speed. The impacting velocities of feedstock powder 206 form part 208 on the top of porous surface 202 with no permanent adhesion of part 208 to porous substrate 202.

Specifically, the impacting feedstock powder 206 adhere to the edges of the pores in the porous substrate 202. As the feedstock powder 206 continue to adhere to the edges of the pores, the feedstock powders 206 eventually cover the pores of the porous substrate 202. The part 208 can then be formed on top of the covered pores without becoming permanently affixed to the porous substrate 202.

FIG. 2C illustrates a product removal process from the cross section of the porous substrate 202. The cold spray results in an easy release of part 208 from substrate 202 without the need to cut part 208 from porous substrate 202. In some embodiments, there is no destruction of porous substrate 202, allowing porous substrate 202 to be reused if so desired.

FIGS. 3A-3C are substantially similar to FIGS. 2A-2C with the following described differences. The porous substrate 302 of FIGS. 3A-3C has pores that are through the substrate 302. For example, the porous substrate 302 may be a wire mesh. The wiring of the mesh can be of various materials such as steel, aluminum, copper, etc. In some cases, the wire mesh can be manufactured with a specific pore size that is optimized for the mean particle size of the feedstock powders.

Figure 4:
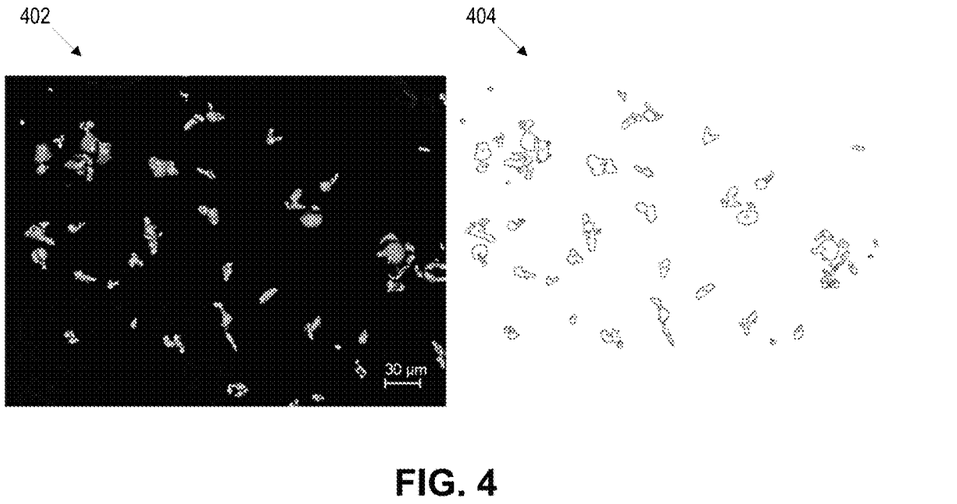
FIG. 4 illustrates a particle morphology and particle size of feedstock powder.

FIG. 4 illustrates a particle morphology and particle size of feedstock powder as obtained by a scanning electron microscope 402 and as processed by ImageJ 404. The feedstock powder imaged is 5-45 μm powders. Based on the electron microscope image 402 and the processed image 40, the mean particle size (mean Feret diameter) is determined to be 12.8 μm with a 90% confidence interval the size is between 11.0 μm and 14.7 μm.

ImageJ is an image processing program that is capable of analyzing and processing images to, for example, calculate area, measure distances, perform geometric transformations, detect edges, etc. In the processed image 404 the detected edges of the feedstock particles as determined by ImageJ are shown. Using the processed image 404, the mean Feret diameter of each particle can be determined and then used to calculate the mean particle size of the feedstock powder.

Figure 5:
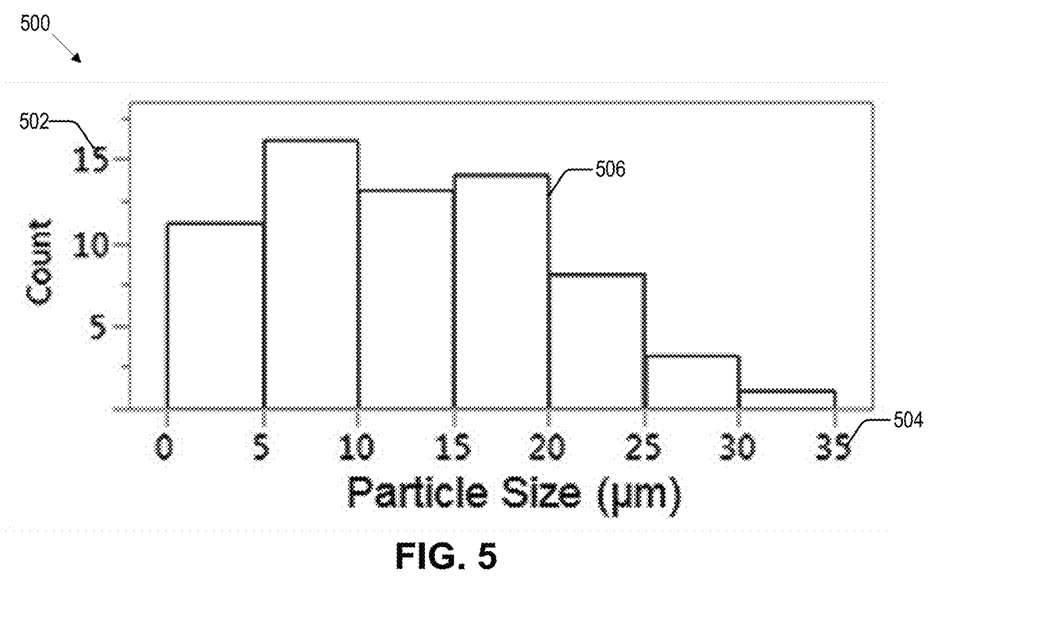
FIG. 5 illustrates a particle size distribution of feedstock powder.

FIG. 5 illustrates a particle size distribution 500 of feedstock powder. The particle size distribution 500 is based on the mean Feret diameters of feedstock particles determined as described with respect to FIG. 4. The particle size distribution 500 shows the count 502 or feedstock particles in particle size ranges 504 in a bar graph 506. The bar graph 506 shows that the majority of feedstock particles are between 5 and 20 μm, which is consistent with the mean particle size of 12.8 μm.

Figure 6:
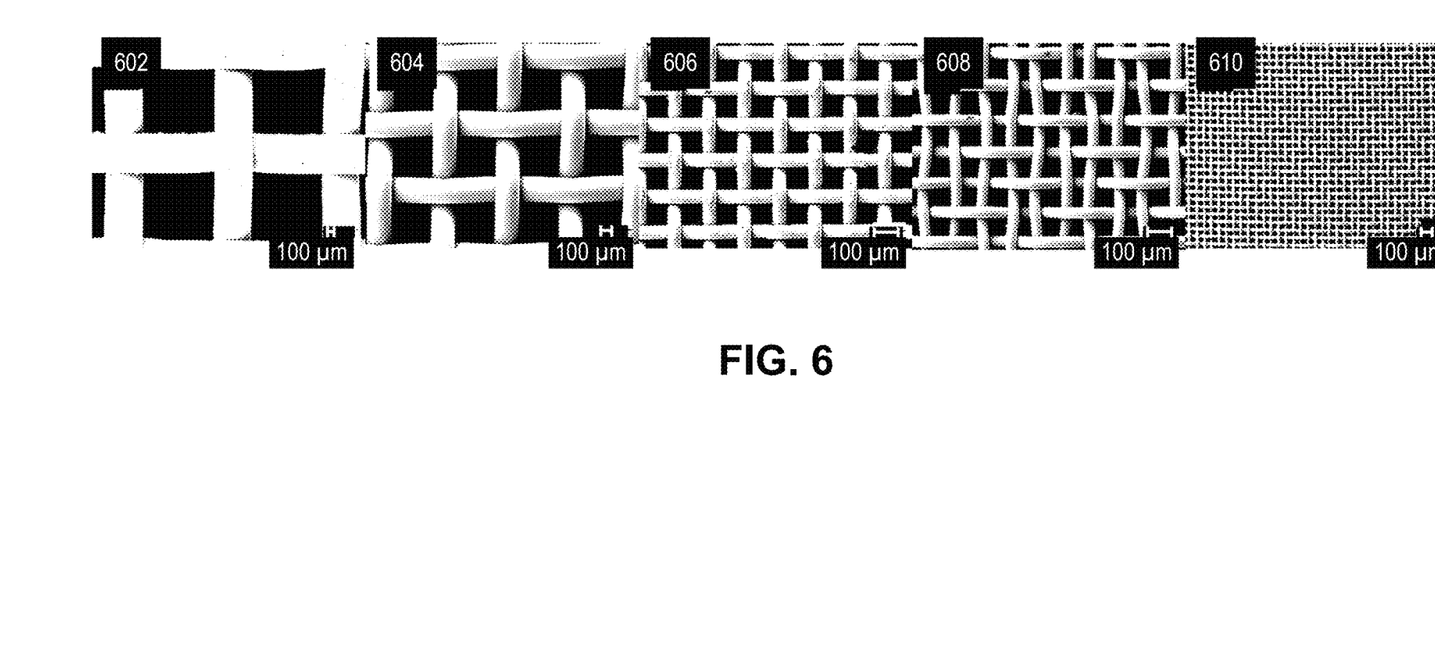
FIG. 6 illustrates microscopic top views of various porous substrates.

FIG. 6 illustrates microscopic top views of various porous substrates. Included in the top views are mesh 16 602, mesh 45 604, mesh 170 606, mesh 200 608, and mesh 400 610. Mesh 16 602 has a pore size of 1087.4±9.7 μm and a wire size of 588.9±3.6 μm; mesh 45 604 has a pore size of 312.8±2.6 μm and a wire size of 197.6±2.6 μm; mesh 170 606 has a pore size of 87.6±0.9 μm and a wire size of 55.5±0.7 μm; mesh 200 608 has a pore size of 68.0±5.4 μm and a wire size of 44.8±0.5 μm; and mesh 400 610 has a pore size of 37.3±1.5 μm and a wire size of 25.5±0.2 μm.

During tests of the various mesh sizes, feedstock powders of 5 to 45 μm penetrated the mesh 45 602 and mesh 16 604, which caused the cold spray to fail to form a part on top of these porous substrates. However, the feedstock powders did form parts on the top surfaces of mesh 170 606, mesh 200 608, and mesh 400 610.

Figure 7:
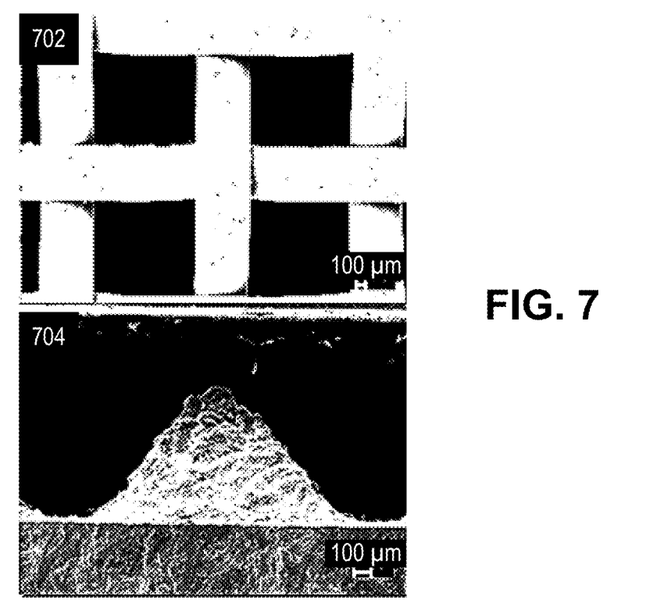
FIG. 7 shows multiple views of a 1087.4 µm porous substrate.

FIG. 7 shows multiple views 702, 704 of a 1087.4 μm porous substrate. Microscopic top view 702 of the 1087.4 μm porous substrate shows the pores defined by the wire mesh. The wire mesh is positioned on a plate layer, which is shown in the cross-section of a microscopic plate view 704. The cross-section of the microscopic plate view 704 shows penetration of the 4 to 45 μm feedstock powders into the 1087.4 μm porous substrate, which prevented the cold spray from forming a part on the top of the 1087.4 μm porous substrate.

Figure 8:
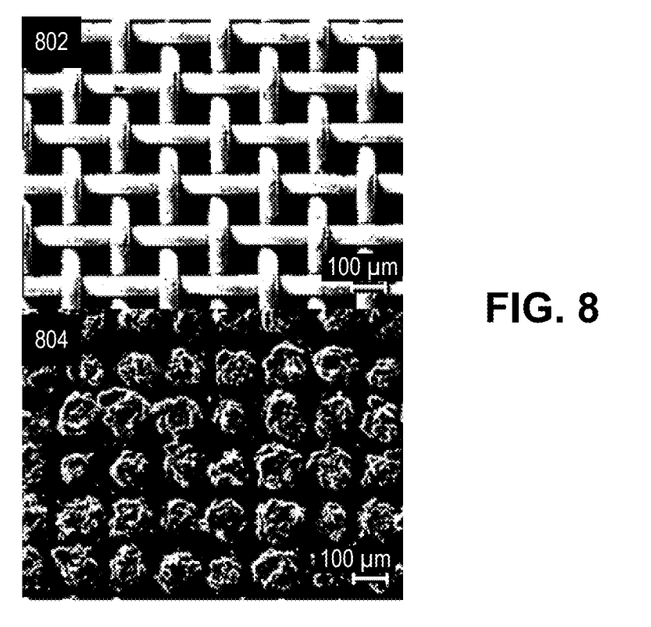
FIG. 8 shows multiple views of a 87.6 µm porous substrate.

FIG. 8 shows multiple views 802, 804 of an 87.6 μm porous substrate. Microscopic top view 802 of the 87.6 μm porous substrate shows the pores defined by the wire mesh. The wire mesh is positioned on a plate layer, which is shown in the top view of a microscopic plate view 804. The top view of the microscopic plate view 804 shows some minor buildup of the 4 to 45 μm feedstock powders onto the plate; however, the minor buildup did not prevent the cold spray from properly forming a part on the top of the 87.6 μm porous substrate.

Figure 9:
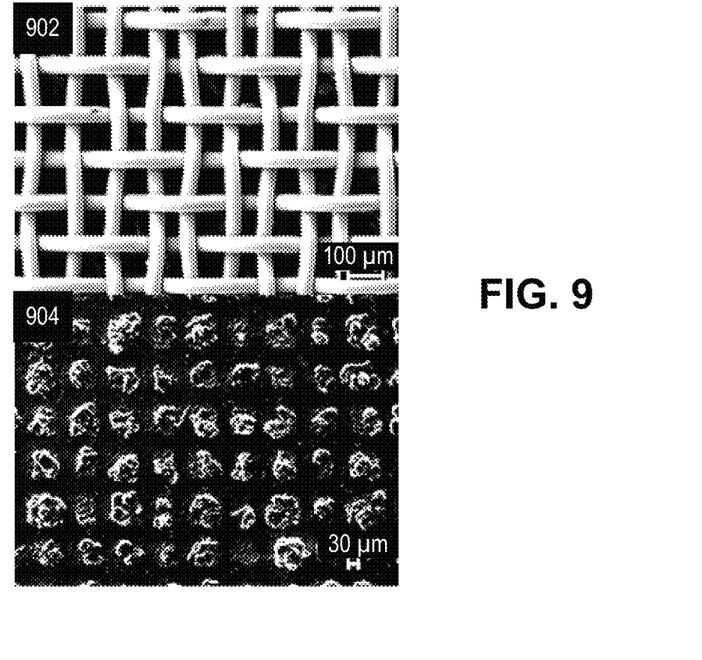
FIG. 9 shows multiple views of a 68.0 µm porous substrate.

FIG. 9 shows multiple views 902, 904 of a 68.0 μm porous substrate. Microscopic top view 902 of the 68.0 μm porous substrate shows the pores defined by the wire mesh. The wire mesh is positioned on a plate layer, which is shown in the top view of a microscopic plate view 904. The top view of the microscopic plate view 904 shows some minor buildup of the 4 to 45 μm feedstock powders onto the plate; however, the minor buildup did not prevent the cold spray from properly forming a part on the top of the 68.0 μm porous substrate.

Figure 10:
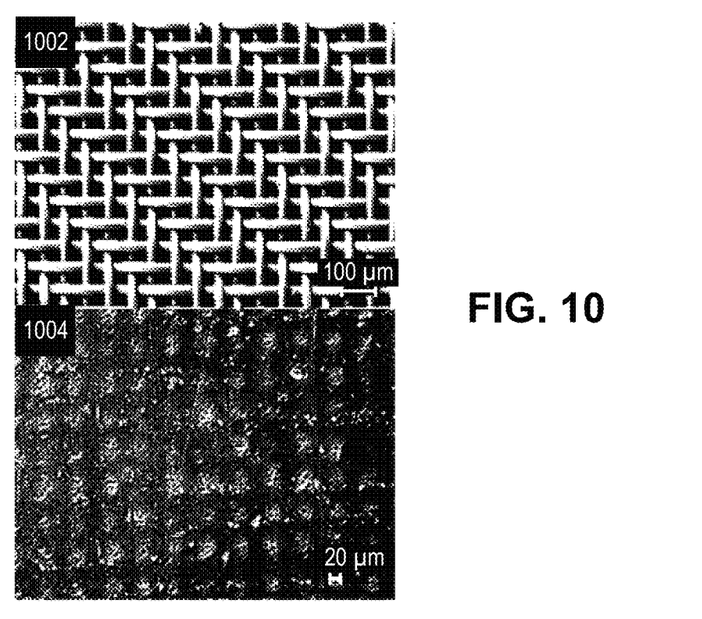
FIG. 10 shows multiple views of a 37.3 µm porous substrate.

FIG. 10 shows multiple views 1002, 1004 of a 37.3 μm porous substrate. Microscopic top view 1002 of the 37.3 μm porous substrate shows the pores defined by the wire mesh. The wire mesh is positioned on a plate layer, which is shown in the top view of a microscopic plate view 1004. The top view of the microscopic plate view 1004 shows almost no buildup of the 4 to 45 μm feedstock powders onto the plate. The cold spray is able to form a part on the top of the 37.3 μm porous substrate.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A porous substrate comprising:
a porous layer for use as a base, and
one or more feedstock powders applied by cold spray and forming a part on the porous layer, wherein the part is not permanently bonded with the porous layer;
the porous layer further comprising:
a plurality of pores, wherein each of the pores has a pore size that is less than approximately 24.4 times a mean particle size of the one or more feedstock powders and is greater than or equal to approximately 6.84 times the mean particle size.

2. The porous substrate of claim 1:
wherein the mean particle size is determined as a mean Feret diameter of the one or more feedstock powders.

3. The porous substrate of claim 1, further comprising:
a nonporous underlayer on, a bottom surface of the porous layer, wherein the part is formed on a top surface of the porous layer.

4. The porous substrate of claim 1:
wherein the mean particle size is between and including 11.0 micrometers and 14.7 micrometers.

5. The porous substrate of claim 4:
wherein the porous layer is a wire mesh, and wherein the plurity of pores are a plurality of through-pores.

6. The porous substrate of claim 5:
wherein the wire mesh has a wire thickness that is equal to or less than approximately 55.5 micrometers.

7. A porous substrate comprising:
a porous layer for use as a base,
one or more feedstock powders applied by cold spray and forming a part on the porous layer, wherein the part is not permanently bonded with the porous layer; and
a non-porous layer located below the porous layer;
the porous layer further comprising:
a plurality of pores, wherein each of the pores has a pore size that is less than approximately 24.4 times a mean particle size of the one or more feedstock powders used in forming the part and is greater than or equal to approximately 6.84 times the mean particle size.

8. The porous substrate of claim 7:
wherein the mean particle size is determined as a mean Feret diameter of the one or more feedstock powders.

9. The porous substrate of claim 7:
wherein the mean particle size is between and including 11.0 micrometers and 14.7 micrometers.

* * * * *